G. LEVERICH.
Axle Box and Hub.
No. 86,558.  Patented Feb. 2, 1869.
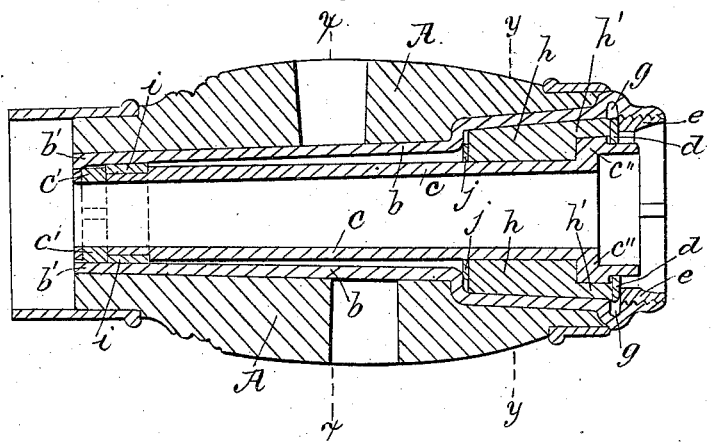
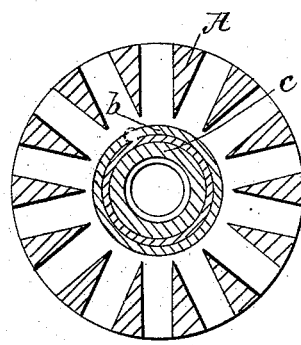
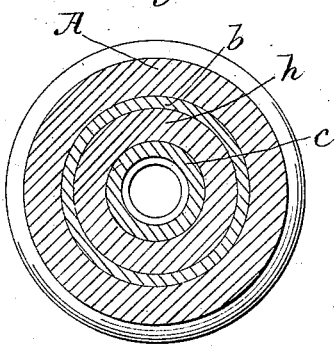
Witnesses
M Coombs
N Kinnier
Inventor
G. Leverich

GABRIEL LEVERICH, OF ELIZABETHPORT, NEW JERSEY.

Letters Patent No. 86,558, dated February 2, 1869.

IMPROVEMENT IN AXLE-BOXES AND HUBS.

The Schedule referred to in these Letters Patent and making part of the same.

*To all whom it may concern:*

Be it known that I, GABRIEL LEVERICH, of Elizabethport, in the county of Union, and State of New Jersey, have invented a new and improved Axle-Box and Hub; and I do hereby declare that the following is a full, clear, and exact description of the same, reference being had to the accompanying drawing, forming a part of this specification, and in which—

Figure 1 represents a longitudinal section of an axle-box and hub, constructed according to my invention;

Figure 2 represents a transverse section of the same, taken through line $x\,x$; and Figure 3, a similar view of the same, taken through the line $y\,y$.

Similar letters of reference indicate corresponding parts in the several figures.

The object of this invention is to prevent the breaking or straining of the spokes of the wheels or the axles of vehicles by the violent wrenching to which they are at times exposed; and The invention consists in the suspending of the axle-boxes within elastic bearings, whereby the spokes and axles are, in a great measure, relieved from strain by the yielding of said bearings during the most severe wrenching to which said parts may be subjected.

In order that others may understand the construction and operation of my invention, I will proceed to describe it, with reference to the drawings.

A is a hub, of the ordinary form and appearance, except that it is provided with an inner shell, $b$, for reception of an axle-box, $c$.

Said shell $b$ is preferably of a formation, as represented in the drawing, i. e., of an outwardly-taper form, and with an enlarged portion near its inner extremity, for reception, between it and the box $c$, of an interposed filling, $h$, of India rubber, or other elastic material.

The box $c$ is provided, near its outer extremity, with a shoulder, $c'$, which fits against an inwardly-projecting shoulder, $b'$, at the outer extremity of the shell $b$, while upon the opposite extremity of said box $c$ is provided a collar or enlargement, $c''$, which is received within a recessed portion, $h'$, of the rubber filling, $h$.

By means of the taper formation of the shell $b$, space is left between the inner surface thereof and the outer surface of the box $c$, along their central and inner portions, so as to provide sufficient "play" for the box during the yielding of the elastic filling, $h$. Said space is kept closed at the terminus of the rubber filling, $h$, by means of a metal washer, $j$, for preventing the forcing therein of a portion of the said rubber filling during the compression of the same.

$d$ is a check-ring, fitting over a reduced portion of the collar $c''$, and is designed not only for retaining the box $c$ within the shell $b$, and preventing the outward compression of the rubber, but also for preventing the entering in of dirt, or dust, or other foreign matter.

A groove, $g$, is provided within the shell $b$, opposite the check-ring $d$, so as, by the entering therein of the said check-ring, to allow for the oscillation or play of the box $c$.

The said check-ring $d$ is held in place, and the box $c$ thereby confined within the shell $b$, by means of a screw-cap, $e$, screwed into the entrance of the said shell.

Rotation of the box within the shell, as also the shell within the hub, is prevented by means of ribs upon the one fitting within corresponding grooves within the other.

To permit oscillation, and reduce friction, slight play is allowed between the shoulders $b'$ and $c'$, and, to prevent rattling and wear, a rubber ring, or band, $i$, is fitted into a reduced portion or neck of the box $c$, near its outer end, and is compressed between it and the interior of the corresponding part of the shell $b$.

The rubber filling, $h$, is inserted between the shell and box, under a degree of pressure proportionate to the character of vehicle to which it is applied, and the amount of weight which it is liable to carry, but, in all cases, said pressure should be sufficient to provide a firm and unyielding support to the axles while upon even ground.

The outer extremity $h'$ of the said filling, $h$, also is designed to protrude a little beyond the collar $c''$, so that, when the cap, $e$, is screwed in, the said portion $h'$ will be subjected to an additional degree of compression, independently of that to which the mass of filling, $h$, is subjected, whereby the check-ring $d$ may be made to sustain a proportionately greater amount of pressure outwardly than the collar $c''$, thus providing for a sufficient yielding of the filling necessary in allowing the limited longitudinal movement of the box at times, without materially lessening the pressure of the said portion $h'$ against the check-ring $d$. By this means, the said check-ring $d$ is held more firmly against the screw-cap $e$ at all times, thereby more effectually excluding dust and other foreign matter from the interior of the hub.

It is preferred to give to the inner and outer surfaces of the check-ring $d$, as well as the movable parts which come in contact therewith, a spherical formation to a sufficient degree, taking the length of the box as a radius, to provide for the free oscillation of the hub when necessary.

The action of the parts, in the operation of this invention, is to transmit any sudden wrench or strain from the point of contact at the rim to the elastic bearing around the box which, in yielding, allows an oscillatory movement of the wheel and hub about the box, thereby taking up the shock, which, in other cases, is borne in all its severity by the spokes of the wheel, and the spindle upon which the said wheel is carried.

What I claim as my invention, and desire to have secured by Letters Patent, is—

1. The box $c$, sustained within the hub A in yielding bearings $h\ i$, substantially as and for the purpose herein set forth.

2. The combination, with the hub and axle-box, of the taper shell $b$ and elastic filling $h\ i$, substantially as herein described.

3. The combination of the shell $b$, provided with groove $g$, and the box $c$, having collar $c''$, with the screw-cap $e$ and check-ring $d$, substantially as and for the purpose set forth.

G. LEVERICH

Witnesses:
J. W. COOMBS,
A. KINNIER.